United States Patent [19]

Griencewic

[11] Patent Number: 5,801,919
[45] Date of Patent: Sep. 1, 1998

[54] ADJUSTABLY MOUNTED CAMERA ASSEMBLY FOR PORTABLE COMPUTERS

[75] Inventor: Richard W. Griencewic, McCook Lake, S. Dak.

[73] Assignee: Gateway 2000, Inc., North Sioux City, S. Dak.

[21] Appl. No.: 832,940

[22] Filed: Apr. 4, 1997

[51] Int. Cl.$^6$ .................................................. G06F 1/16
[52] U.S. Cl. ........................... 361/683; 348/552; 361/681
[58] Field of Search ........................ 361/681, 683–686; 364/708.1; 348/158, 207, 552; G06F 1/16

[56] References Cited

U.S. PATENT DOCUMENTS

| | | | |
|---|---|---|---|
| D. 363,471 | 10/1995 | Shima et al. | D14/106 |
| 5,475,441 | 12/1995 | Parulski et al. | 348/552 |
| 5,533,097 | 7/1996 | Crane et al. | 379/58 |
| 5,550,754 | 8/1996 | NcNelley et al. | 364/514 A |
| 5,610,730 | 3/1997 | Osipchuk | 358/494 |

FOREIGN PATENT DOCUMENTS 8-22343  1/1996  Japan .

OTHER PUBLICATIONS

"Flexcam", Product Literature published by Videolabs, cover sheet, pp. 4, 6 & 7, prior to Apr. 4, 1997.

"ImageNet", Product Advertisement published by MRT, 1 page, prior to Apr. 4, 1997.

"Charge Coupled Devices", Product Literature published by Sharp Electronic's Corporation, 2 pages (1994).

"flexCAM User Guide", Guide Version 2.0 published by Software Magic, Inc., 2 pages unnumbered and pp. 1–27 (May 16, 1996).

"Starter Camera", *Byte*, p. 128 (May 1996).

"Toshiba IK–M27A—Toshiba's CCC Color Camera for the Desktop", Product Brochure published by Toshiba, 2 pages (Jun. 1994).

"VK–C15S(N)/VK–C15ES(N) Multimedia Camera (Chassis Type)", Product Literature published by Hitachi, Ltd., 2 pages (Sep. 1994).

deJong, J., "Road Show: Videoconferencing for Notebooks", *Computer Shopper*, pp. 276–277 (Nov. 1995).

1993Q2 rem–conf Mainling List Archives: "More on FlexCam", Ari Ollikainen, 3 pages, Jun. 10, 1993.

*Primary Examiner*—Lynn D. Feild
*Attorney, Agent, or Firm*—Schwegman, Lundberg, Woessner & Kluth, P.A.

[57] ABSTRACT

A portable computer has a main body section, a display screen and an adjustable camera assembly. The camera assembly is carried by the portable computer and has a limited field of view and a discernable viewing direction. The camera assembly is moveable relative to the portable computer so that the viewing direction may be adjusted without moving the main body section or display screen.

10 Claims, 12 Drawing Sheets

FIG. 12

ADJUSTABLY MOUNTED CAMERA ASSEMBLY FOR PORTABLE COMPUTERS

FIELD OF THE INVENTION

The present invention relates to computer technology, and more specifically to a portable computer including integral video conferencing capabilities.

BACKGROUND OF THE INVENTION

Portable computers, typically known as notebook or laptop computers, have traditionally not included systems for permitting video conferencing. Video conferencing requires the availability of some type of camera which can be connected to the computer and associated software and hardware for providing the interface between the computer and camera and another video conference participant. As laptop computer technology progresses further toward portable multi-media systems and video conferencing becomes a more popular communication medium, the need for portable computer systems having video conference capability becomes increasingly important.

Video cameras are available for use in conjunction with a computer for establishing a video link with a similarly equipped computer. Such cameras are generally available as a separate stand alone unit. The camera may either have a base on which it rests or may be of a hand-held type, both of which plug into a Standard Serial Bus of the computer. Neither type of camera is particularly well suited for use with a portable computer. Laptop computers are meant to be produced as a single unit and be relatively small and lightweight so that they are not cumbersome to carry nor difficult to set up and operate. A stand alone camera of either type would require one to connect and disconnect the camera from the portable computer each time the system is used or stored. Such a system requires more set up and tear down time and more storage space and effort to carry, negating some of the benefits of a portable computer.

Several types of remote cameras are available which may be connected to a notebook or laptop computer for video hook-up. One type of camera is mounted to a small base which is intended to sit atop a computer monitor or adjacent a computer. Another type of camera includes a base or stand which carries a flexible stalk. The camera is mounted to the top of the stalk. The camera viewing direction is adjustable by moving the stalk to point the camera at an intended video subject.

A portable notebook computer is available from International Business Machine Corp. (IBM) which has a built-in mini-camera mounted on the cabinet on top of the display. The camera is directed towards the computer's user for sending a video image of the user to another video conference participant.

What is needed is a portable computer specifically intended for video conference use. What is also needed is a portable computer where the video camera is an integral part of the computer. What is further needed is a portable computer with a camera that has an adjustable viewing direction permitting the user to select the video subject and direct the camera toward the subject. What is also needed is a portable computer which is not significantly larger or heavier than a standard notebook or laptop and yet includes an integral camera.

SUMMARY OF THE INVENTION

The invention teaches a portable computer having a built-in video camera which is adjustable so that a user may select a video subject and move the camera to view the subject as desired.

In one embodiment, the invention comprises a portable computer having a main body section housing the essential electronics of the computer and a display screen carried by the main body section. The computer also carries an adjustable camera assembly which may be moved and adjusted relative to the computer. The camera assembly has a limited field of view and a discernable viewing direction and is moveable so that the viewing direction is adjustable without moving the main body section or the display screen.

In one embodiment, the camera assembly is carried by the display screen on top of the screen's bezel. In this embodiment, the camera assembly is carried on a support base which is moveable between a storage position at least partially recessed within the bezel and an operational position extending at least partly from said recess. The camera assembly is rotatable side to side on the support base to adjust the viewing direction of the camera. The camera is adjustable vertically by moving the display screen relative to the main body section. The camera may alternatively be adjustable relative to the mount to adjust the viewing direction vertically.

In another embodiment, the camera assembly is carried on a camera base which pivots about its bottom end. The camera assembly and mount rotate between a storage position within a recess of the bezel of the display screen and an operational position extending from the recess. This rotation resembles a jackknife or switch blade function. The camera assembly is again rotatable side to side relative to the mount to adjust the viewing direction of the camera.

In yet another embodiment, the camera assembly is carried on the distal end of a flexible rod. The rod is moveable between a storage position where the camera and rod are received within a recess or channel in a side member of the screen's bezel to an operational position where the camera and rod extend from the channel. The camera is rotatable about the top of the rod for side to side adjustment of the camera's viewing direction. The rod is flexible over at least a part of its length so that the rod may be bent in any direction to further vertically adjust or to otherwise skew the camera's viewing direction.

According to one aspect of the invention, the portable computer is specifically intended for video conference use. According to another aspect of the invention, the video camera is an integral part of the portable computer. According to yet another aspect of the invention, the camera has an adjustable viewing direction permitting the user to select the video subject and direct the camera toward the subject without moving the computer. According to a further aspect of the invention, the portable computer and integral camera is not significantly larger or heavier than a standard portable computer.

BRIEF DESCRIPTION OF THE DRAWINGS

In the accompanying drawings in which several of the preferred embodiments of the invention are illustrated.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
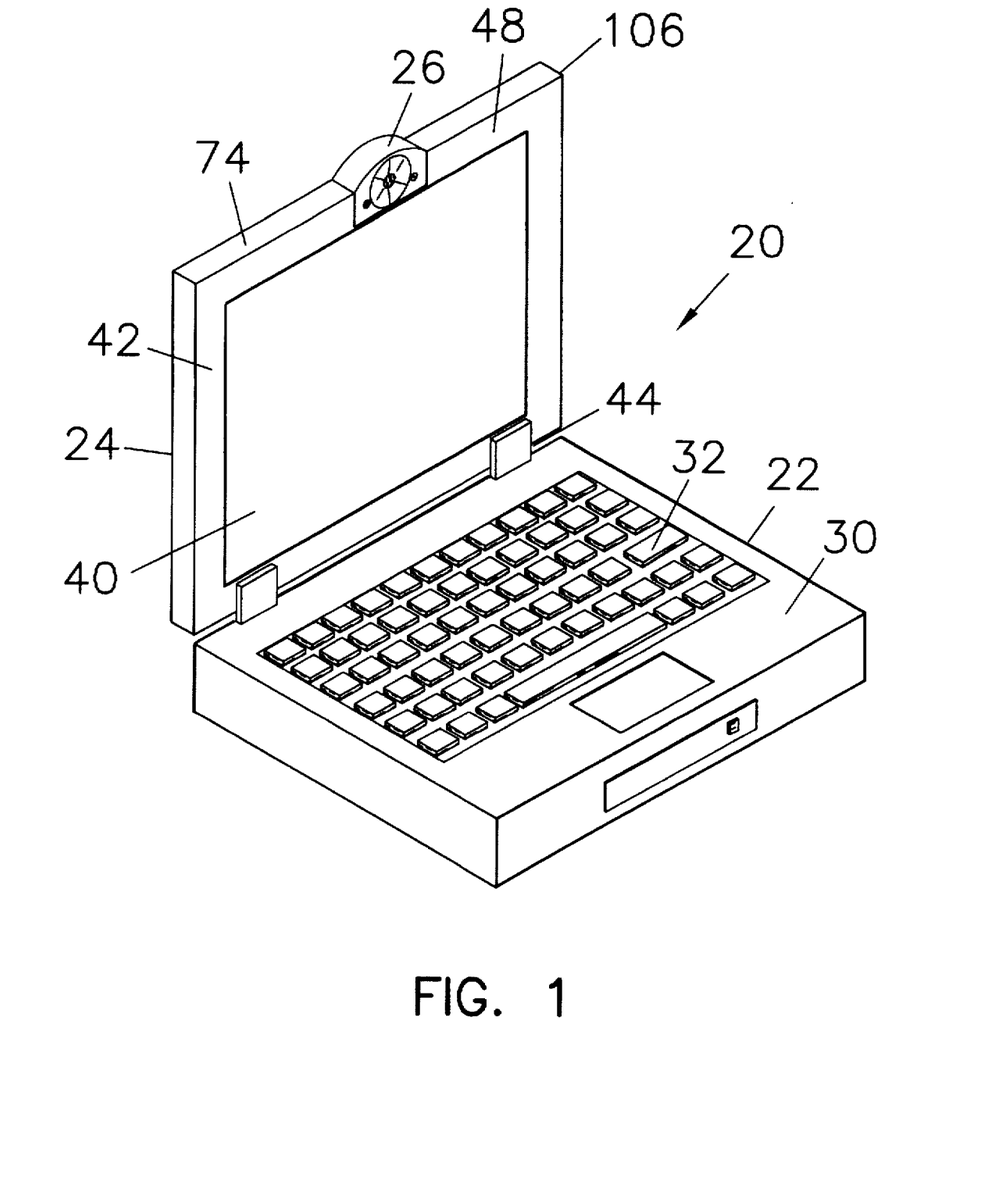
FIG. 1 is a perspective view of a representative portable laptop or notebook computer including an integral camera assembly constructed in accordance with one embodiment of the invention.

Referring now to the drawings, FIG. 1 illustrates one embodiment of a portable computer, typically referred to as either a notebook or a laptop computer, having an integral video camera assembly adjustably mounted to the computer chassis. A portable computer 20 is illustrated in FIG. 1 and includes a main body section 22, a display screen 24, and a camera assembly 26 disposed atop the display screen.

Main body section 22 of the computer 20 includes an upper surface 30 defining a data entry surface including a plurality of data entry keys 32 thereon. The main body section 22 includes therein the various hardware and electronics associated with a typical or conventional laptop. As will be evident to those skilled in the art, main body section 22 of the computer 20 may take on any number of configurations and constructions without departing from the scope of the present invention.

Figure 2:
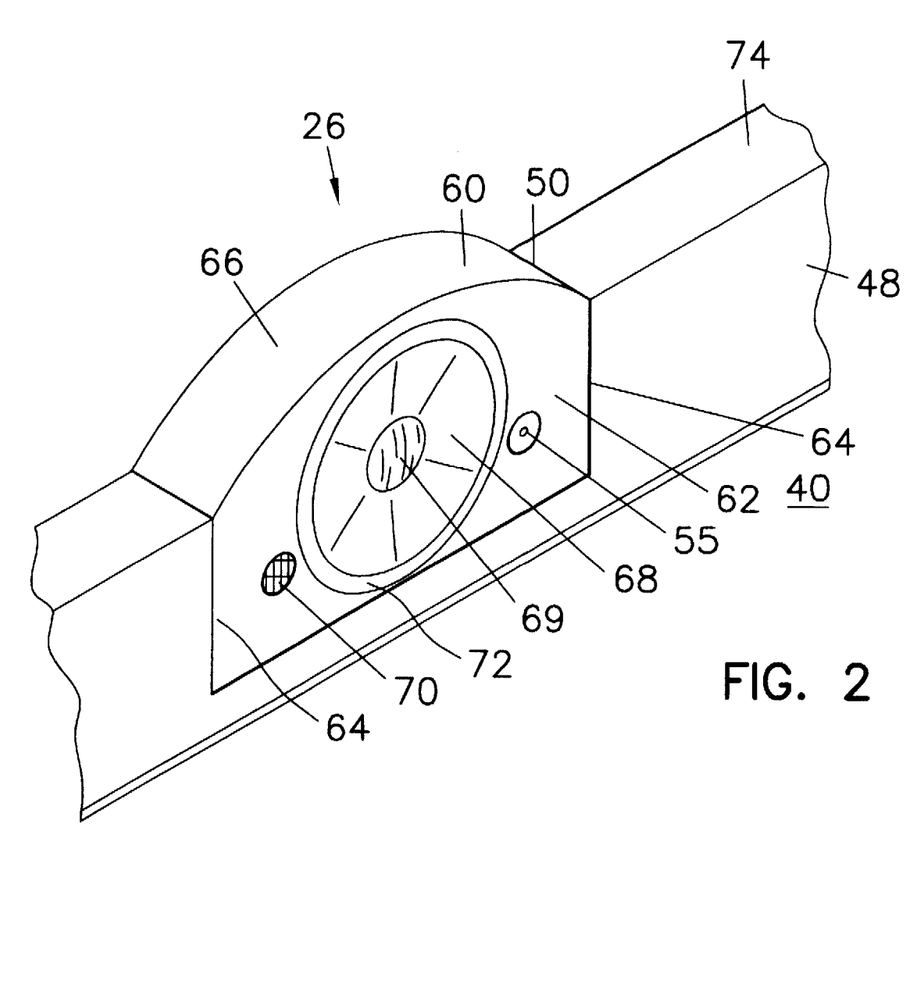
FIG. 2 is a partial front view of the computer illustrating the camera assembly of FIG. 1 in a storage position.

Display screen 24 includes a display panel 40 supported by a perimeter bezel 42 which surrounds the display panel. A hinge or pivot 44 rotatably joins display screen 24 at its bottom end to the main body section. Camera assembly 26 is carried on a top bezel member 48 of the display screen 24 within a recess 50 as illustrated in FIG. 2 in perimeter bezel 42. The camera assembly 26 may be carried by computer 20 in a number of manners without departing from the scope of the invention as long as the camera assembly is adjustable in some way relative to computer 20.

Figure 3:
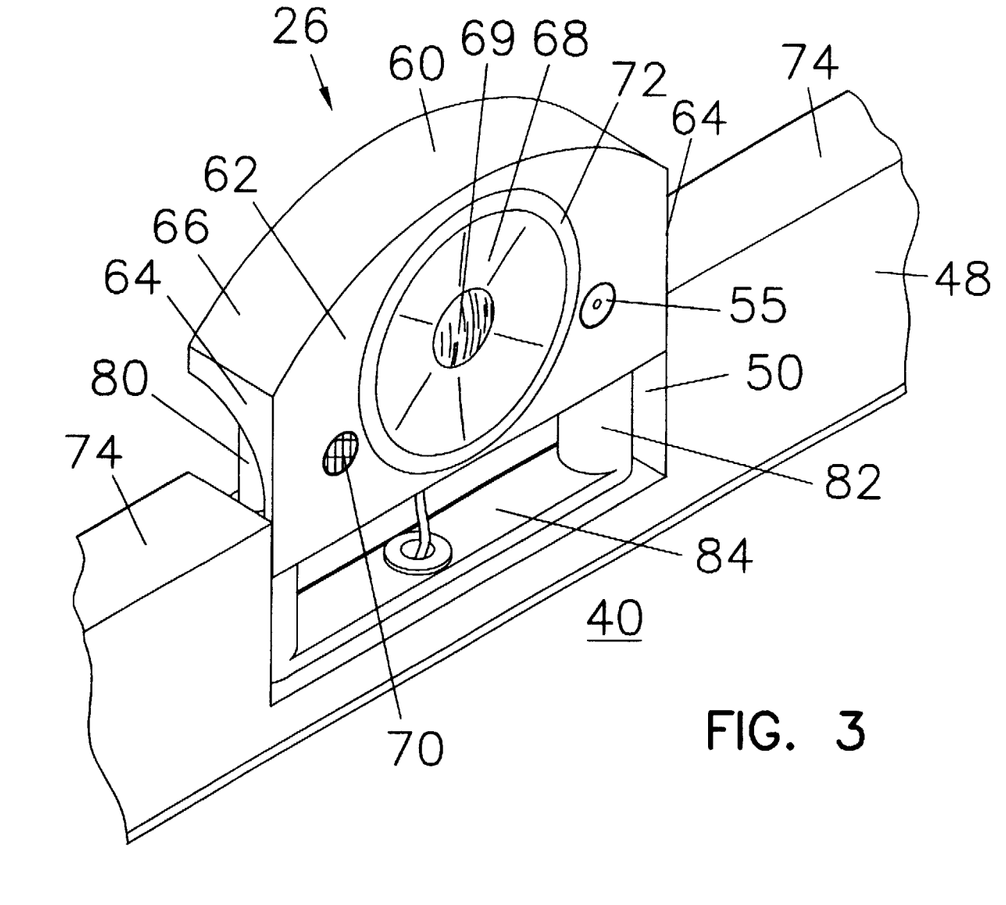
FIG. 3 is a front view of the computer of FIG. 1 where the camera is popped up to an operational position.
Figure 4:
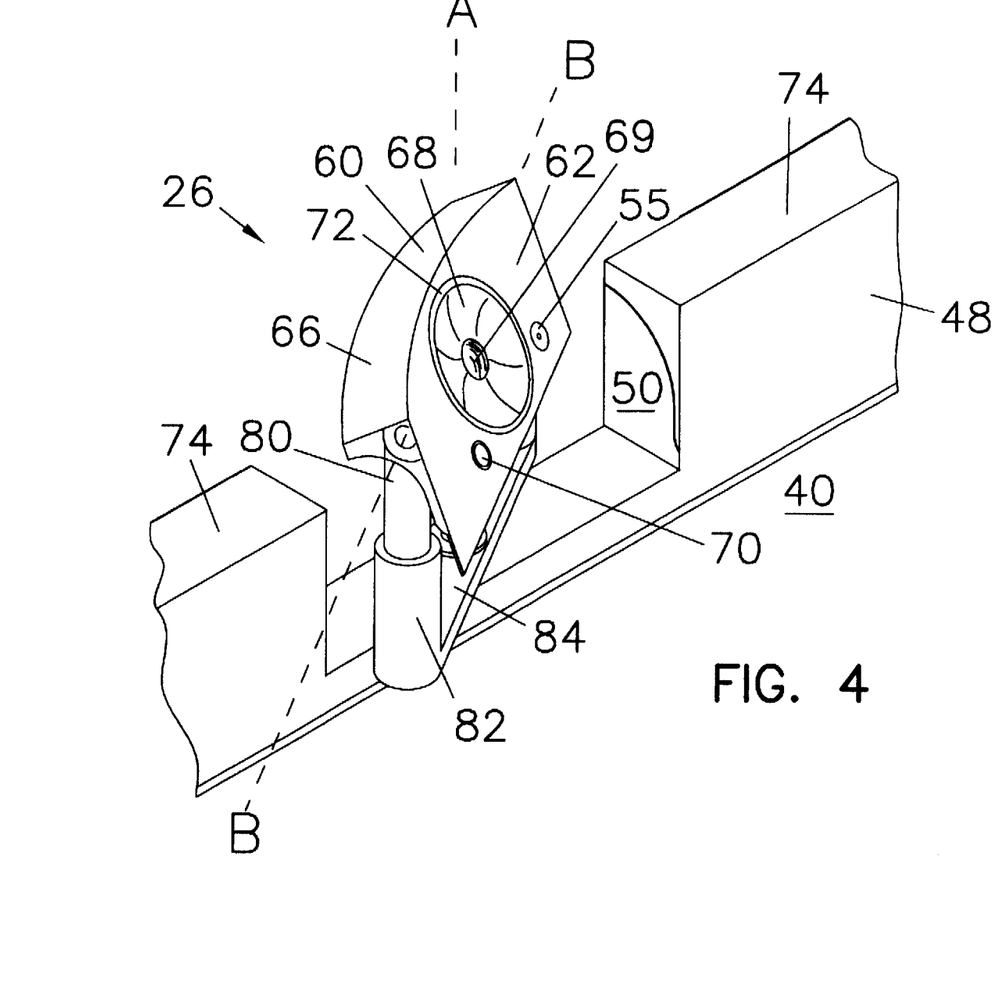
FIG. 4 is a partial front view of the computer and camera assembly of FIG. 1 illustrating the camera assembly in an exemplary adjusted position.

FIGS. 1-6 illustrate one embodiment of a laptop computer having an integral and adjustable camera assembly. In this embodiment, camera assembly 26 is movable from a first position or storage position received within recess 50 of top bezel member 48 as illustrated in FIGS. 1 and 2 to a second or operational position extending from the recess as illustrated in FIGS. 3 and 4. As illustrated in FIGS. 1 and 2, camera assembly 26 includes a camera housing 60 having a front face 62, a pair of opposed side edges 64 and a top edge 66. A lens assembly 68 is supported by housing 60 whereby a lens 69 of the lens assembly 68 is directed outward from front face 62. Lens 69 has a discernable viewing direction which preferably is essentially perpendicular to front face 62 of the housing. Lens 69 also has a limited field of view determined by the qualities and characteristics of the lens as desired.

As will be evident to those skilled in the art, camera assembly 26 may include a microphone 70 disposed on housing 60 for receiving sound vibrations produced by a subject at which lens assembly 68 is directed. Camera assembly 26 may also include a focus feature such as an adjustable focus ring 72 which may be rotated in either direction to focus lens assembly 68 on a desired subject. The camera assembly may further include an indicator light 55 disposed on the housing. The indicator light 55 may be an LED or equivalent light for showing when the camera is turned on and operating. Alternatively, the indicator light 55 may be used to alert the computer user to other circumstances. The camera assembly may further include a zoom feature (illustrated in the embodiment of FIGS. 9-12) for zooming in on a subject as desired without departing from the scope of the invention.

As illustrated in FIGS. 1 and 2, camera assembly 26 is received within recess 50 in the storage position wherein camera housing 60 is fully seated within recess 50. In this embodiment, lens assembly 68 is still exposed when camera assembly 26 is in the storage position, thus permitting the camera assembly to function and video an intended subject even when in the storage position. Alternatively, camera assembly 26 may be designed such that it only functions when moved from the storage position. Also as illustrated in FIGS. 1 and 2, top edge 66 of camera housing 60 extends above a top surface 74 of top bezel member 48. As will be evident to those skilled in the art, top edge 66 may be flush with or dip below top surface 74 as well.

Figure 5:
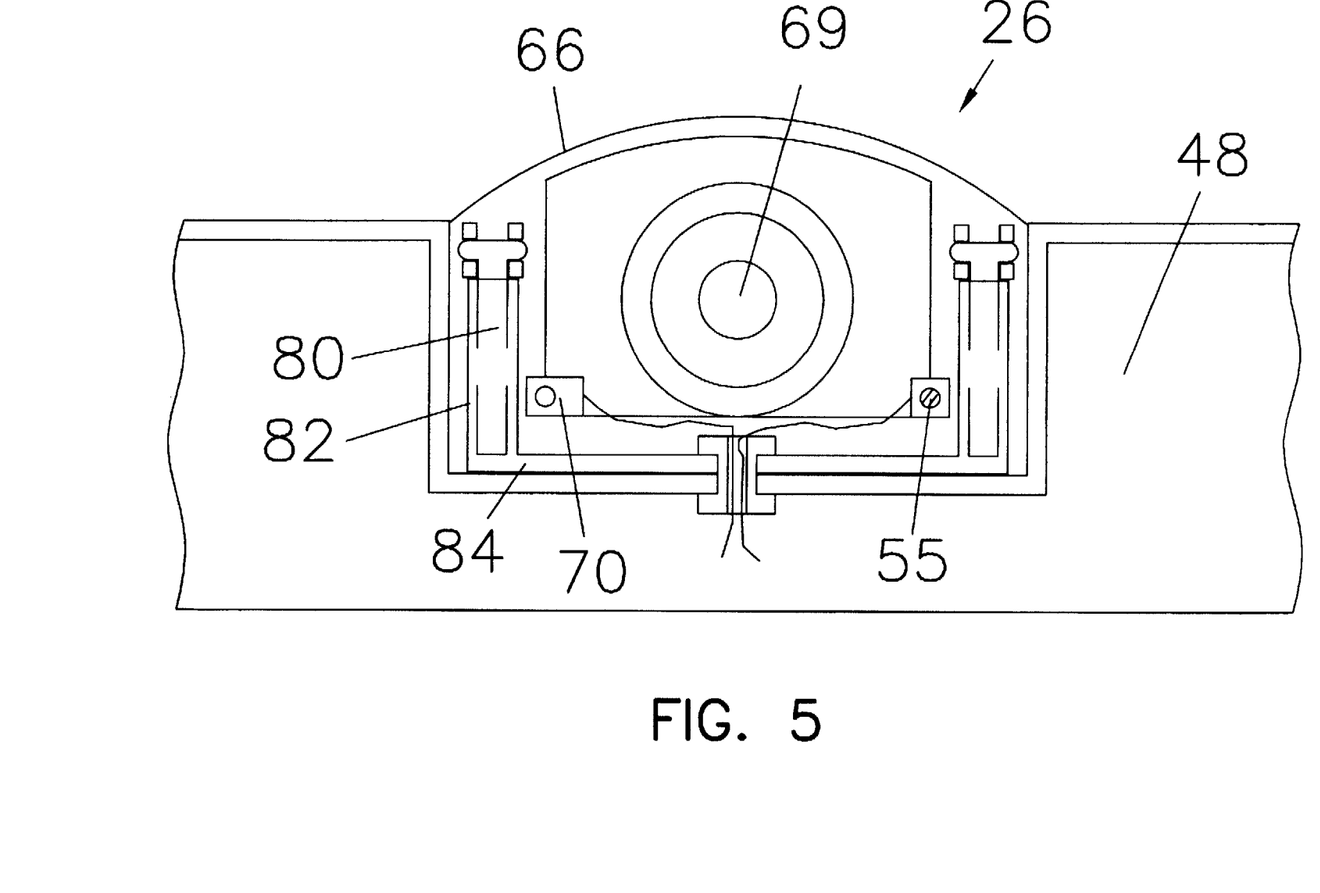
FIG. 5 is a partial fragmentary sectional view of one alternative embodiment of the camera assembly of FIG. 1.

In the present embodiment, as illustrated in FIGS. 3, 4 and 5, camera assembly 26 is movable from the storage position to the operational position from within recess 50. In this embodiment, housing 60 includes a pair of downwardly depending telescoping members 80 received within a corresponding pair of upwardly extending tubular members 82 which are carried on a camera support or support base 84 disposed within recess 50. To move camera assembly 26 from the storage position to the operational position, a user simply pulls housing 60 upward such that telescoping members 80 extend from tubular members 82 such as in FIGS. 3, 4 and 5 while support base 84 remains disposed within the recess.

Additionally, in this embodiment, support base 84 may be rotated about its center or a first axis "A" relative to recess 50 such that the viewing direction of lens 69 may be selectively adjusted from side to side. It is preferred that camera assembly 26 may be adjusted about first axis "A" a full 360° from side to side. This side-to-side adjustment feature is best illustrated in FIG. 4.

Figure 6:
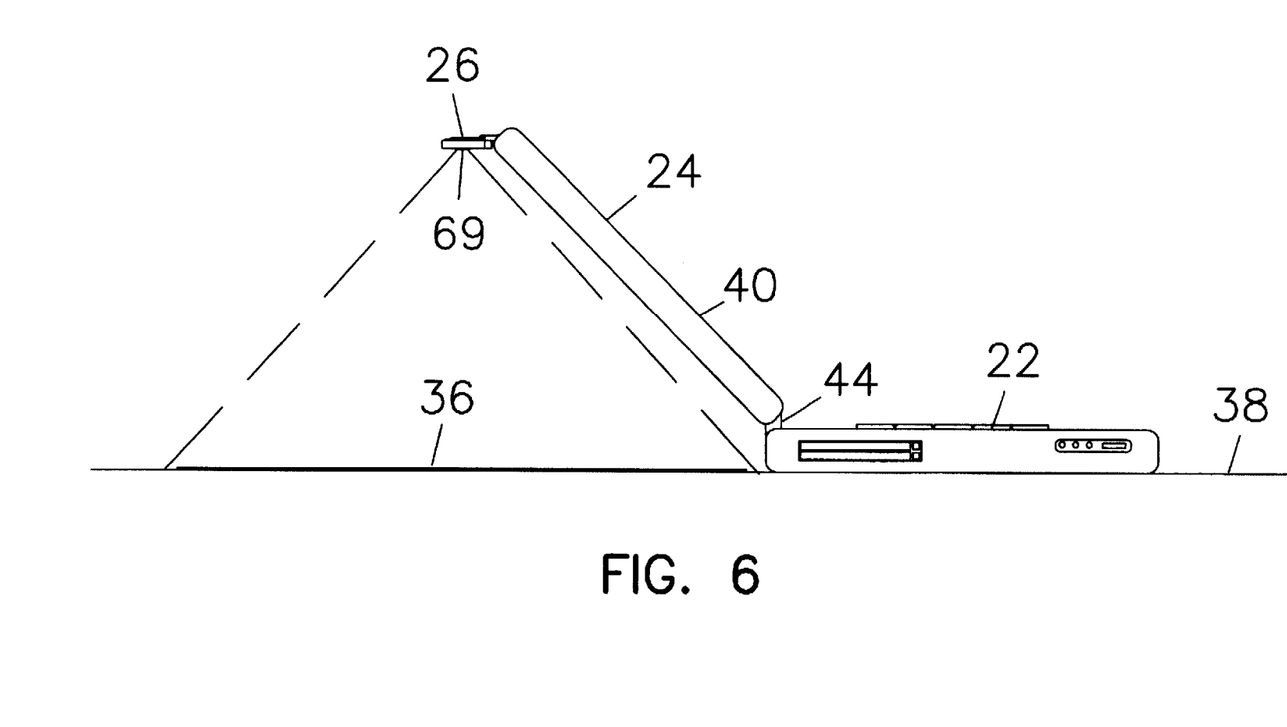
FIG. 6 is a side perspective view of the computer of FIG. 1 illustrating the camera assembly in an alternative exemplary adjusted position.

In an alternative embodiment also shown in FIG. 4, camera assembly 26 may be pivotally adjustable about a second axis "B" which is perpendicular to first axis of rotation "A" of support base 84. This is so that camera assembly 26 may be pivoted about the second axis to vertically adjust the viewing direction of lens 69 as well. In this alternative embodiment, the viewing direction of the lens may be adjusted to view in nearly any direction without moving the position of display screen 24 or main body section 22 of the computer. Without this second axis of rotation, the viewing direction of lens 69 may simply be vertically adjusted by rotating display screen 24 relative to main body section 22 as best illustrated in FIG. 6. The combination of rotating the display screen and providing the camera assembly with a second axis of rotation may also be utilized as will be evident to those skilled in the art.

Providing camera assembly 26 with both the proper viewing characteristics and the first and second axes of rotation described above permits using the camera as a document scanner. This combined feature may be used to scan documents 36 placed behind computer 20 on the support surface 38 as illustrated in FIG. 6. The camera assembly 26 is positioned in a predetermined angle for scanning documents 36. For placing the camera assembly 26 in a predetermined angle, the hinge 44 may be provided with a notch (not shown) for engaging the display panel 40 in the appropriate angle relative to the support surface 38.

As will be evident to those skilled in the art, the construction and configuration of camera housing 60, support base 84, as well as the components providing the extension or pop-up feature of camera assembly 26 may vary considerably without departing from the scope of the present invention. The embodiments illustrated herein are simply provided to demonstrate the intended adjustability of camera assembly 26 relative to the computer.

Figure 7:
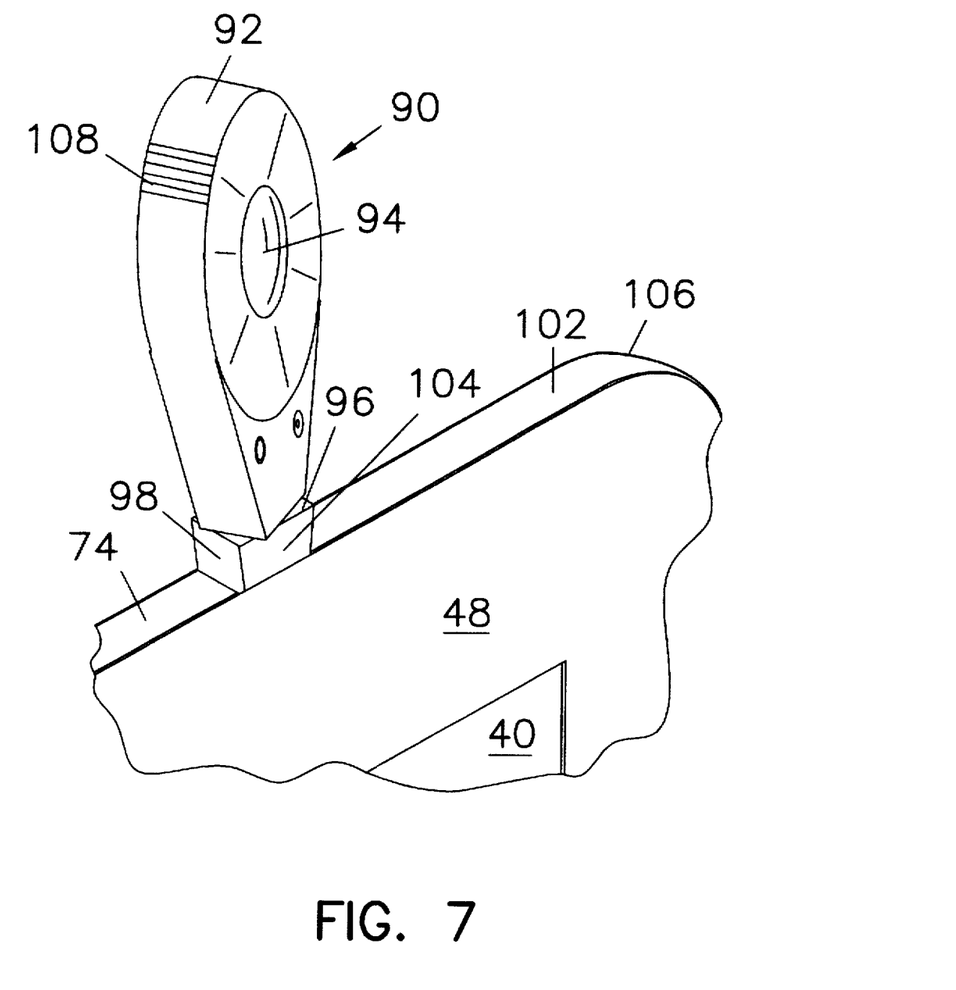
FIG. 7 is a perspective view of a portable notebook or laptop computer having an alternative embodiment of a camera assembly shown in an operational position.
Figure 8:
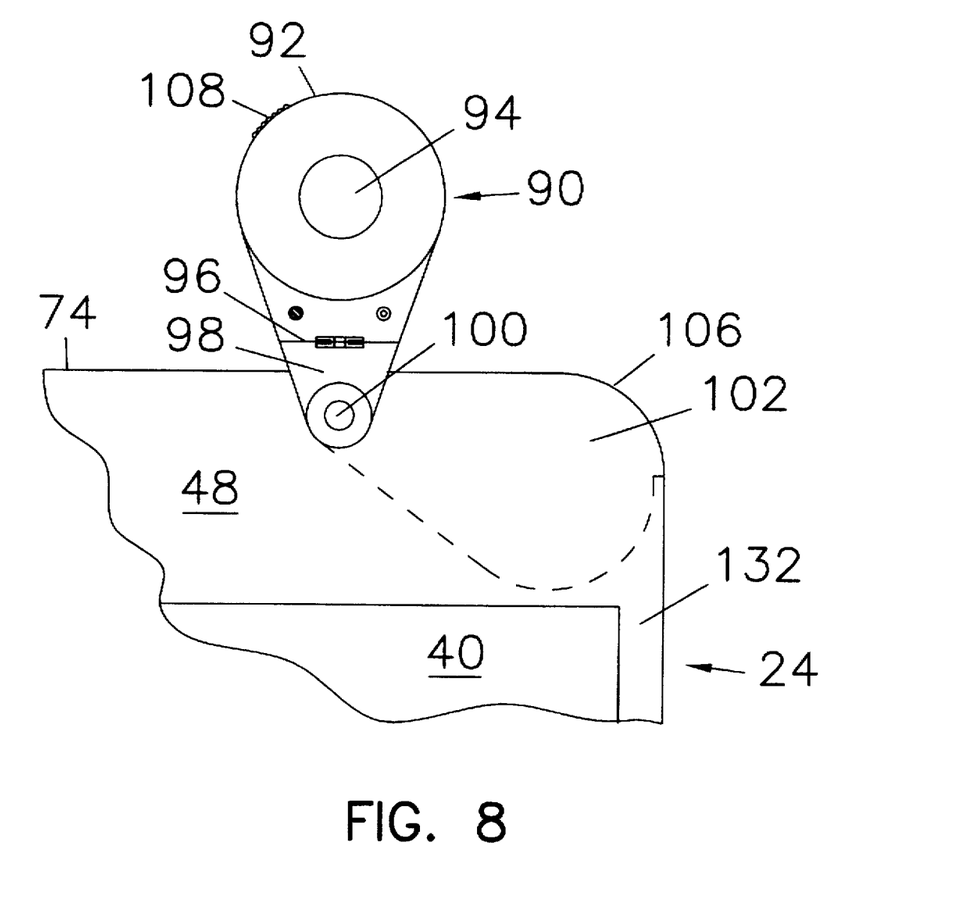
FIG. 8 is a partial fragmentary front sectional view of the display screen and camera assembly of the computer of FIG. 7.

FIGS. 7 and 8 illustrate an alternative embodiment of an adjustable camera assembly for a portable computer. A jackknife-style camera assembly 90 is illustrated therein and has a camera housing 92 supporting a lens assembly 94 therein. Housing 92 includes a neck portion 96 disposed at its bottom end which is rotatably carried by a camera support or camera base 98. The camera base has a pivoting end 100 which is pivotally secured within a recess 102 within top surface 74 of perimeter bezel 42. Camera base 98 also has a support end 104 disposed opposite pivoting end 100 on which camera housing 92 rests.

As illustrated in FIG. 8, jackknife camera assembly 90 is movable about pivoting end 100 from a storage position fully received within recess 102 to an operational position extending upward from top surface 74 of the top bezel member 48. In one embodiment, an exterior surface 108 of the camera assembly 90 lies substantially flush with the top bezel member 48 when the camera assembly 90 is received within recess 102. Housing 92 may be rotated in the present embodiment about neck portion 96 relative to camera base 98 from side to side to adjust the viewing direction of lens assembly 94 similar to the prior embodiment. Again, it is preferred that housing 92 may be rotated 360° relative to camera base 98. In one embodiment of the jackknife camera assembly 90 the vertical viewing direction of lens assembly 94 may be adjusted simply by rotating display screen 24 relative to main body section 22 of the computer. Alternatively, camera base 98 or neck portion 96 or some combination thereof may be provided with a second degree of motion permitting fore-and-aft tilting of camera assembly 90 relative to the display screen 24 for providing vertical adjustment.

Additionally, camera assembly 90 may be provided with a microphone, a focus feature, an LED indicator light and a zoom feature as with the prior embodiment. As will be evident to those skilled in the art, the construction and configuration of housing 92, and camera base 98 may vary greatly in form and construction without departing from the scope of the present invention.

As illustrated in FIGS. 7 and 8, the contour of perimeter bezel 42 adjacent recess 102, corner 106 in this embodiment, may be designed to correspond with the contour of the exterior surface 108 of housing 92 so that when camera assembly 90 is received within recess 102, the exterior surface of the camera assembly will lie flush with top surface 74 of top bezel member 48. Thus, in this embodiment, the housing 92 of camera assembly 90 defines its own protective cover over the camera assembly and recess 102 when in the storage position. Additionally, in this embodiment, lens assembly 94 is not exposed and is protected by perimeter top bezel member 48 when received within recess 102. As will be evident to those skilled in the art, lens assembly may be exposed when in the storage position as in the embodiment of FIGS. 1–6. Similarly, the lens assembly 68 of the prior embodiment may be covered and protected by a portion of perimeter bezel 42 as described in the present embodiment of FIGS. 7 and 8.

The location of camera assembly 90 may also be varied without departing from the scope of the invention. Camera assembly 90 may be mounted within one of the bezel side members, centrally on the top bezel member 48 or at either end of the top bezel member 48. Additionally, the camera assembly may be oriented to rotate to the left or to the right of the pivot end 100 when carried in the top bezel member 48. If carried by one of the side members, camera assembly 90 may be oriented upward or downward relative to its pivoting end 100.

FIGS. 9–12 illustrate another alternative embodiment of an adjustable camera assembly for a laptop computer. A periscope-type camera assembly 120 is illustrated therein. Camera assembly 120 has a camera housing 122 supporting a lens assembly 124 received on a distal end 126 of a flexible rod 128. Camera assembly 120 in this embodiment is received in a recess defined by a longitudinal channel 130 extending lengthwise within a side member 132 of perimeter bezel 42. Channel 130 opens into top surface 74 of perimeter top bezel member 48. A camera pocket or nest 134 is formed adjacent opening 133 in the top surface 74 at the top of channel 130 for receiving camera housing 122 therein as described below.

Figure 9:
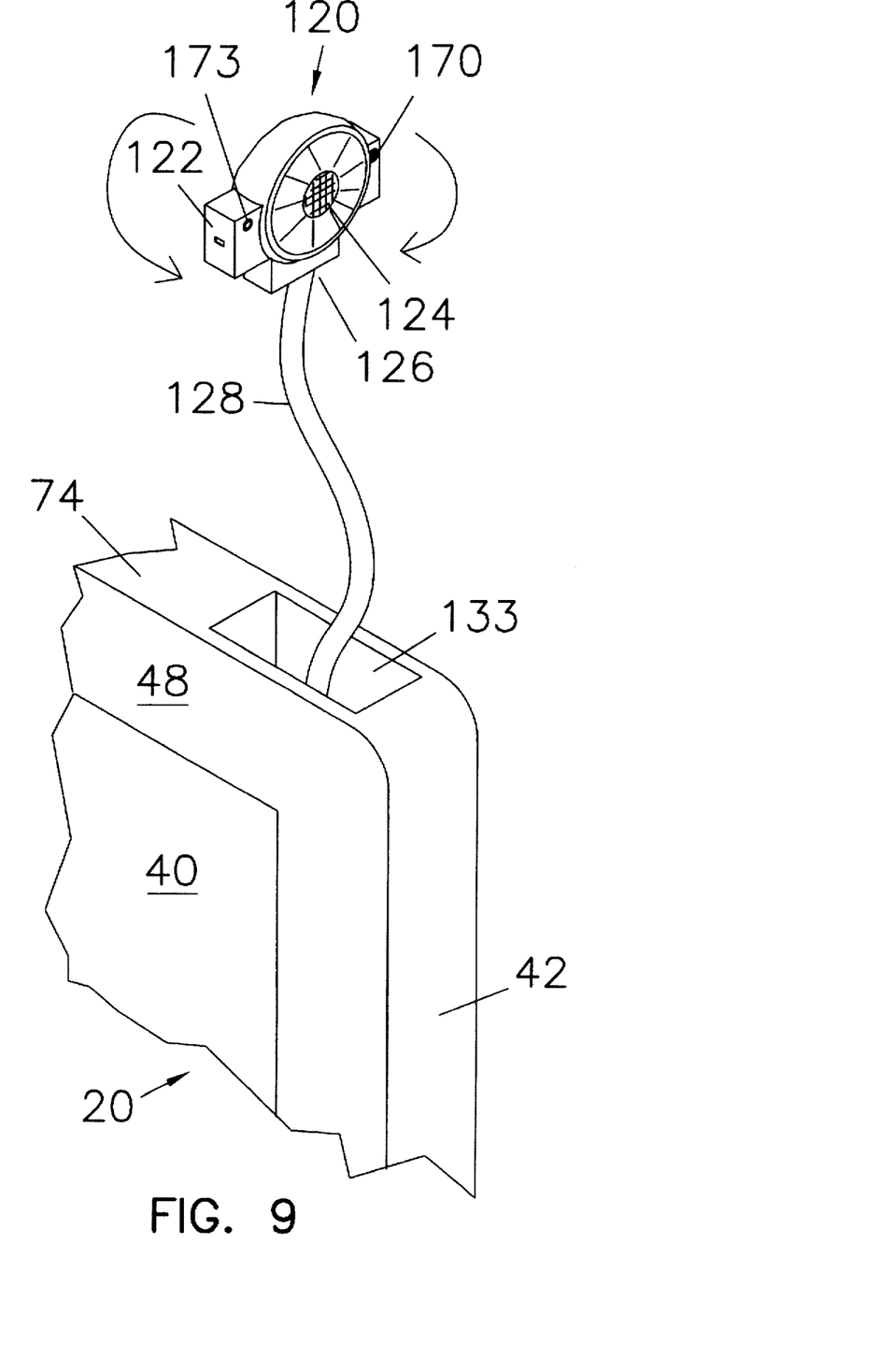
FIG. 9 is a partial perspective view of a portable notebook or laptop computer having another alternative embodiment of a camera assembly constructed in accordance with the invention.

In one embodiment, as illustrated in FIG. 9, flexible rod 128 carries the camera housing 122 on its distal end 126 and includes wiring connections 136 at its other end 138 for connection to the computer. The remaining portion of channel 130 defined below camera nest 134 is a shuttle tube 140 for receiving and guiding therealong a shuttle block 142 which provides positive support for flexible rod 128 as it moves along shuttle tube 140. To positively position camera assembly 120 along channel 130, one or more spring tension members 144 and 145 may be disposed adjacent a lower end 146 and adjacent an upper end 148, respectively, of shuttle tube 140. Tension members 144 or 145 are received in detents 150 formed in shuttle block 142 when the shuttle block is positioned adjacent thereto. As camera assembly 120 is retracted to a storage position within channel 130 (FIG. 10), shuttle block 142 moves to the lower end 146 of shuttle tube 140 where spring tension members 144 will engage detents 150 to positively hold camera assembly 120 in place. As camera assembly 120 is extended to an operational position extending from channel 130 (FIGS. 9 and 11), shuttle block 142 moves to the upper end 148 of shuttle tube 140 wherein the spring tension members 145 engage detents 150 in the shuttle block. Additionally, a third pair of spring tension members (not shown) may be disposed within camera nest 134 for engaging detents 156 formed in camera housing 122 as illustrated in FIG. 11 providing positive positioning for camera housing 122 as well.

Figure 10:
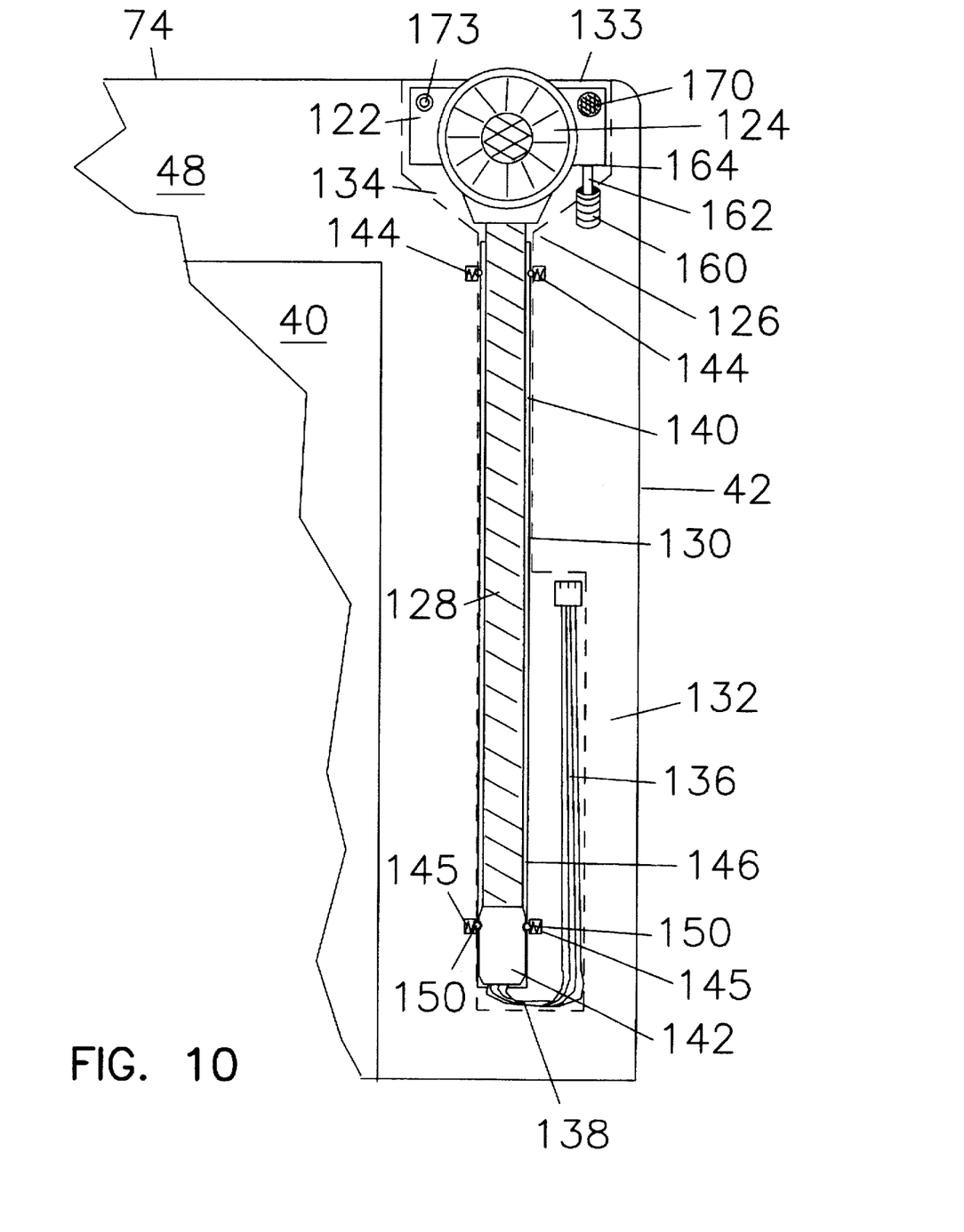
FIG. 10 is a partial fragmentary front sectional view of the computer and camera assembly of FIG. 9 shown in a storage position.
Figure 11:
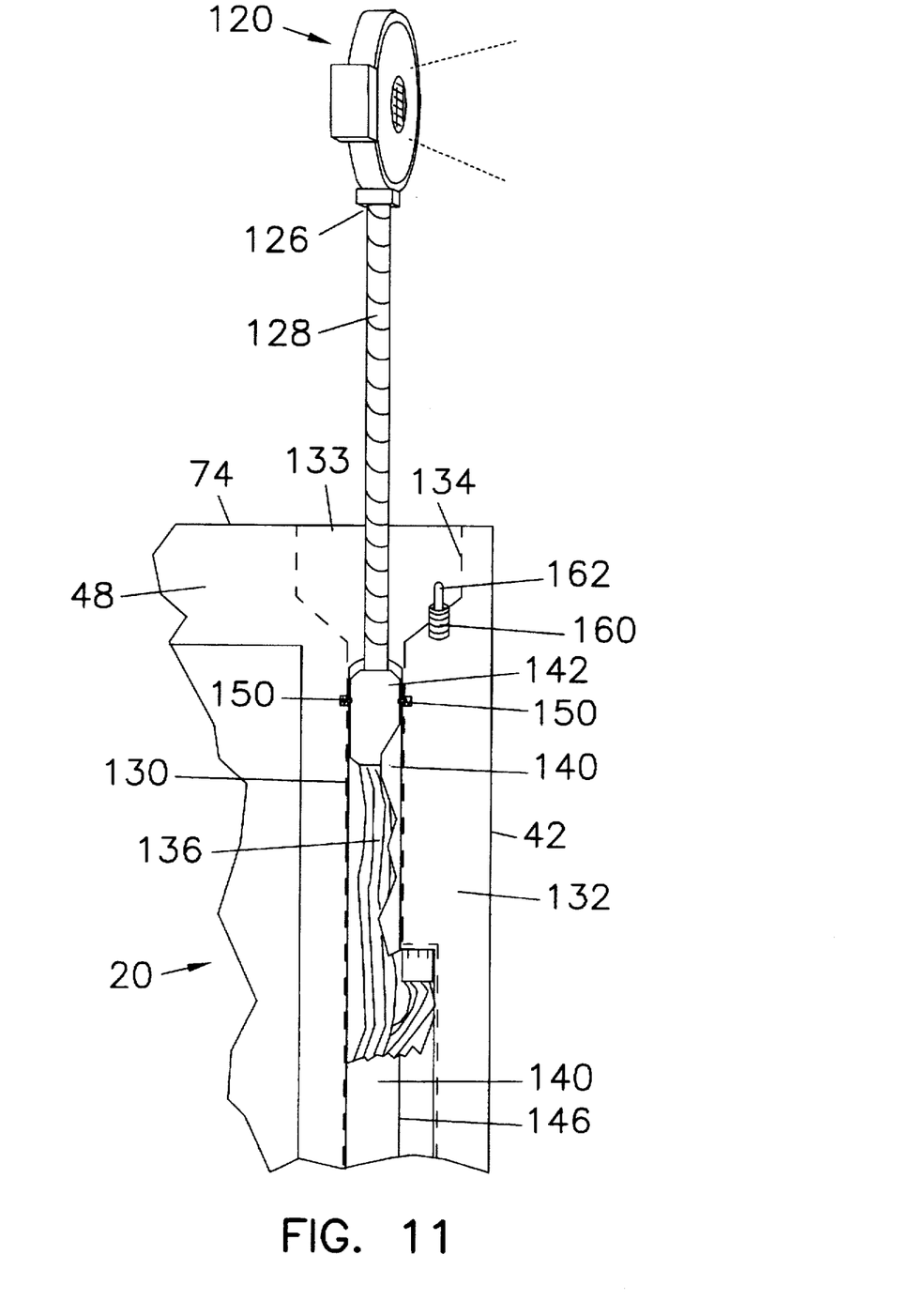
FIG. 11 is a partial fragmentary front sectional view of the computer and camera assembly of FIG. 9 shown in an operational position.
Figure 12:
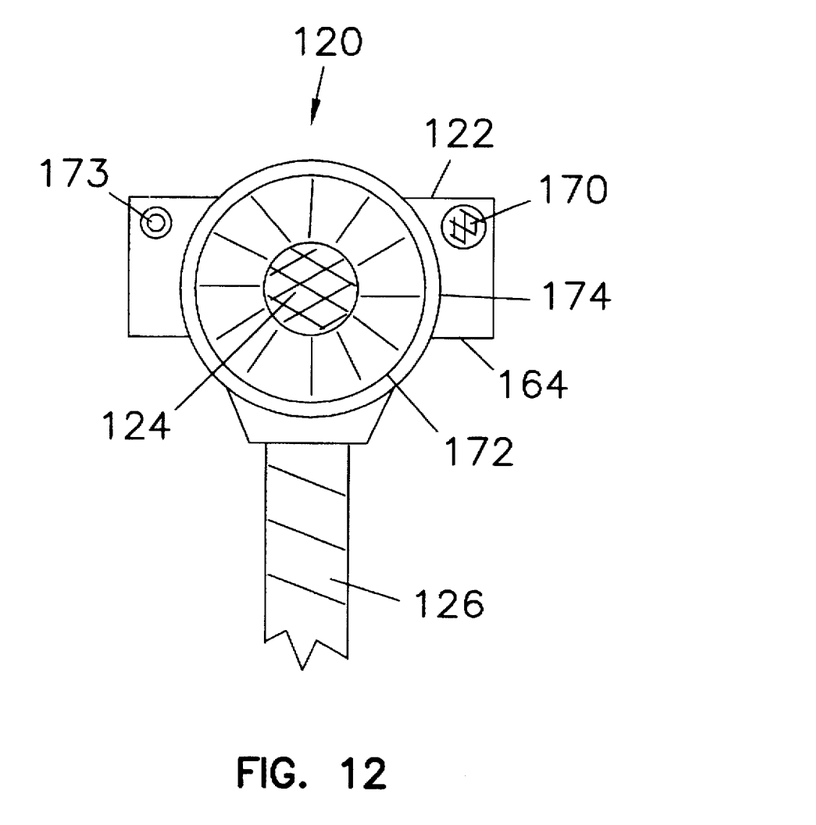
FIG. 12 is a front view of a portion of the camera assembly of FIG. 9.

As further illustrated in FIGS. 10 and 11, a spring 160 engaging a retractable plunger 162 may be disposed within bezel side member 132 extending into camera nest 134. The spring and plunger may be adapted to engage a shoulder 164 on camera housing 122 for positively forcing the camera housing from camera nest 134 as camera assembly 120 is extended from its retracted position. Spring 160 and plunger 162 may be provided with a positive latching mechanism so that as camera housing 122 is first retracted into opening 133 and into camera nest 134, the plunger locks into place. As camera housing 122 is then pressed down into camera nest 134, the plunger latch may release whereby spring 160 would then urge plunger 162 against the camera housing forcing camera assembly 120 from within the channel.

In the present embodiment, flexible rod 128 is of a coiled metal structure which may be bent in any number o C directions and to any number of angles for adjusting the viewing direction of camera lens assembly 124. It is preferred that flexible rod 128 be constructed so that it may be easily manipulated and bent but will retain and hold its position once moved to a desired position or orientation. Additionally, camera assembly 120 is preferably rotatable for side to side adjustment of the viewing direction of lens assembly 124. Flexible rod 128 is preferably fixed at one end to shuttle block 142 and fixed to camera housing 122 at its distal end 126. The side to side rotation is provided by twisting flexible rod 128 which inherently permits a predetermined amount of twist over its length. The flexible rod will hold a selected position and orientation by virtue of the frictional and rigidity characteristics of the coiled metal structure. Such a construction prevents fatigue damage or failure to the electrical leads within the flexible rod.

As in the prior embodiments, camera assembly 120 may be provided with a microphone 170, a focus feature or ring 172, an indicator light 173 and a zoom feature or ring 174 as well. The focus and zoom features may easily controlled by software and connected electronically to one or more keys or to the pointer of the computer for manipulation of either or both features. Additionally, camera assembly 120 may be housed in either side bezel member with the channel opening into the top bezel member, or be housed in the top member with the channel opening into either side bezel member.

A protective cover (not shown) may be provided for any of the three embodiments described herein for covering the respective recess when the camera assembly is received in the storage position. The protective cover may be slidable or may be a snap-fit cover. Alternatively, as discussed above, the camera housing of each camera assembly embodiment may provide its own protective cover when received within its respective recess.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A portable computer having a main body section, a display screen carried by said main body section, and an adjustable camera assembly carried by said portable computer, wherein:

said camera assembly is moveably and adjustably joined to said portable computer; and said camera assembly has a limited field of view and a discernable viewing direction, said camera assembly being moveable such that said viewing direction is adjustable without moving said main body section or said display screen;

said display screen comprises a perimeter bezel having at least a top member and a side member, said camera assembly being moveably joined to said bezel;

said camera assembly is further moveable between a storage position and an operational position, said camera assembly being received within a recess in said bezel when in said storage position and extends from said recess when in said operational position;

said recess comprises a channel extending internally within said side member of said bezel and opening into said top member of said bezel, said channel being unexposed to an outside surface of the display screen.

2. The portable computer of claim 1 wherein said camera assembly is carried by a flexible rod, said flexible rod and said camera assembly being received within said channel when in said storage position and extending from said channel with said camera assembly spaced from said bezel when in said operational position.

3. The portable computer of claim 2 wherein said rod comprises at least one flexible segment permitting adjustment of said viewing direction of said camera assembly by bending said at least one flexible segment in a desired manner.

4. A portable computer having a main body section, a display screen carried by said main body section, and an adjustable camera assembly carried by said portable computer, wherein:

said camera assembly is moveably and adjustably joined to said portable computer;

said camera assembly has a limited field of view and a discernable viewing direction, said camera assembly being moveable such that said viewing direction is adjustable without moving said main body section or said display screen;

a camera support wherein said camera assembly is rotatable relative to a first rotational axis extending generally perpendicular from said camera support for side to side rotational adjustment of said viewing direction of said camera assembly relative to said display screen; and said camera assembly is further tiltable about a second rotational axis which is generally perpendicular to said first rotational axis for vertical adjustment of said viewing direction of said camera assembly relative to said display screen.

5. The portable computer of claim 4 wherein said camera assembly pivots about a pivoting end of said camera support such that said camera assembly pivots into a storage position within said recess and pivots out to an operational position extending from said recess.

6. The portable computer of claim 4 wherein said camera assembly further comprises a microphone disposed on said camera assembly.

7. The portable computer of claim 4 wherein said camera assembly further comprises a focus feature disposed thereon for focusing said camera assembly on a particular subject as desired.

8. The portable computer of claim 4 wherein said camera assembly further comprises a zoom feature disposed thereon for selectively adjusting said field of view of said camera assembly relative to a particular subject as desired.

9. The portable computer of claim 4 wherein said camera assembly further comprises an indicator light disposed thereon for indicating when said camera assembly is in use.

10. A portable computer having a main body section including a plurality of electronic components therein and a keyboard on its upper surface, a display screen having a generally rectangular perimeter shape rotatably carried by said main body section, a bezel disposed around said perimeter of said display screen, and an adjustable camera assembly carried by said bezel and being electrically connected to said portable computer, said camera assembly comprising:

a camera support being moveable between a storage position disposed within a recess in said bezel and an operational position extending from said recess, said recess being internal to said bezel and unexposed to an outside surface of the display screen;

a lens housing carried on said camera support and being rotatably adjustable about a first rotational axis extending generally perpendicularly from said camera support when said camera support is in said operational position;

a lens apparatus carried by said lens housing, said lens apparatus having a discernable viewing direction relative to said lens housing and a limited field of view in said viewing direction; and wherein said viewing direction is adjustable without moving said main body section or said display screen by rotating said lens housing relative to said camera support about said first rotational axis.

* * * * *